United States Patent
Riahi

(10) Patent No.: US 8,297,933 B2
(45) Date of Patent: Oct. 30, 2012

(54) WIND TURBINE BLADE WITH MODULAR LEADING EDGE

(75) Inventor: Amir Riahi, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 13/296,704

(22) Filed: Nov. 15, 2011

(65) Prior Publication Data

US 2012/0156048 A1    Jun. 21, 2012

Related U.S. Application Data

(63) Continuation of application No. 12/968,709, filed on Dec. 15, 2010, now Pat. No. 8,057,189.

(51) Int. Cl.
*B64C 11/24* (2006.01)

(52) U.S. Cl. .................... 416/224; 416/229 R; 416/228; 416/235

(58) Field of Classification Search .................. 416/224, 416/228, 229 R, 233, 235, 236 R
See application file for complete search history.

(56) References Cited

U.S. PATENT DOCUMENTS

| | | | |
|---|---|---|---|
| 2,884,078 A | 4/1959 | Stamm et al. | |
| 4,095,322 A * | 6/1978 | Scarpati et al. | 29/889.6 |
| 4,150,920 A * | 4/1979 | Belko et al. | 416/145 |
| 4,188,171 A * | 2/1980 | Baskin | 416/226 |
| 4,275,994 A * | 6/1981 | Underhill, Jr. | 416/226 |
| 4,329,119 A | 5/1982 | Baskin | |
| 4,474,536 A | 10/1984 | Gougeon et al. | |
| 6,264,877 B1 | 7/2001 | Pallu de la Barriere | |
| 7,637,721 B2 | 12/2009 | Driver et al. | |
| 7,854,594 B2 | 12/2010 | Judge | |
| 2007/0036659 A1 | 2/2007 | Hibbard | |

FOREIGN PATENT DOCUMENTS

| WO | WO 2007/051465 | 5/2007 |
|---|---|---|
| WO | WO 2008/086805 | 7/2008 |

* cited by examiner

*Primary Examiner* — Ninh H Nguyen
(74) *Attorney, Agent, or Firm* — Dority & Manning, P.A.

(57) ABSTRACT

A wind turbine blade has a leading edge and a trailing edge and includes an upper shell member and a lower shell member. The shell members include transversely spaced attachment edge that are spaced rearward of the leading edge. A preformed bond cap having opposite legs with rearward edges is mounted to the attachment edges of the upper and lower shell members. The bond cap is preformed into an aerodynamic parabolic shape and size so as to define the leading edge of said blade and lie essentially flush with the upper and lower shell members. The bond cap defines a primary external bonding bridge between the upper and lower shell members and defines at least a portion of the leading edge of the blade.

17 Claims, 6 Drawing Sheets

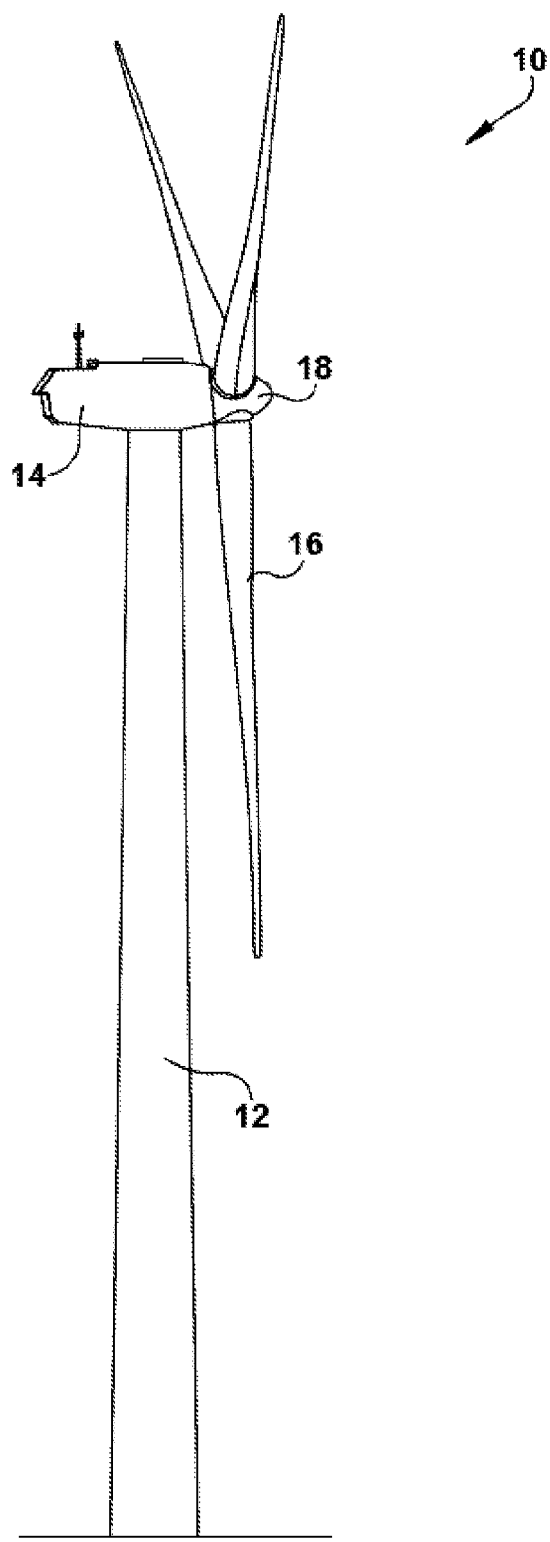
Fig. -1-

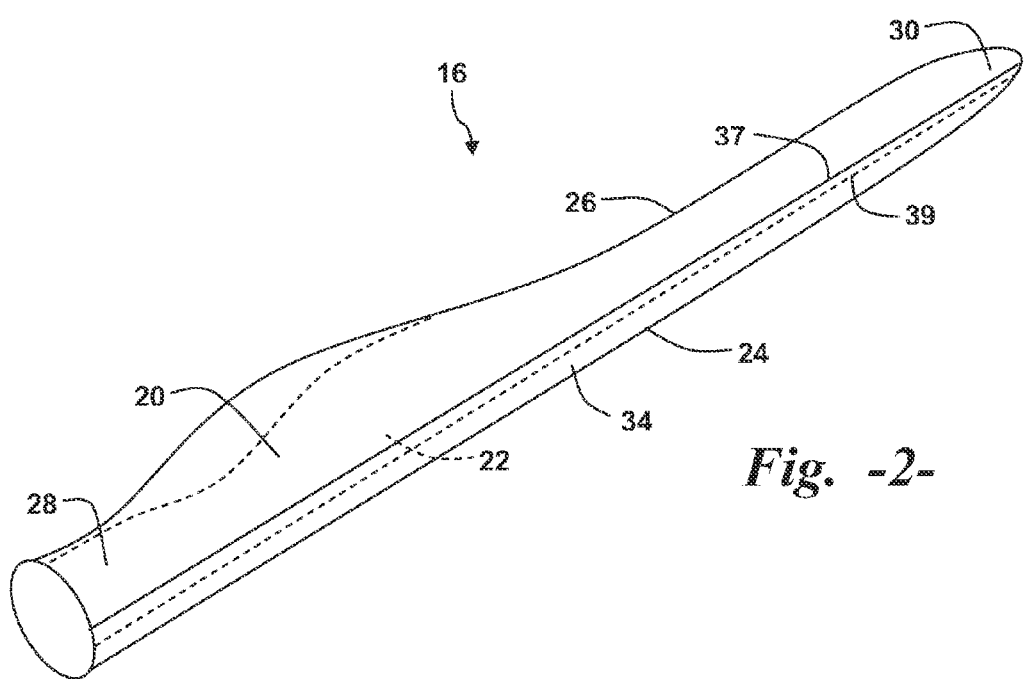
Fig. -2-
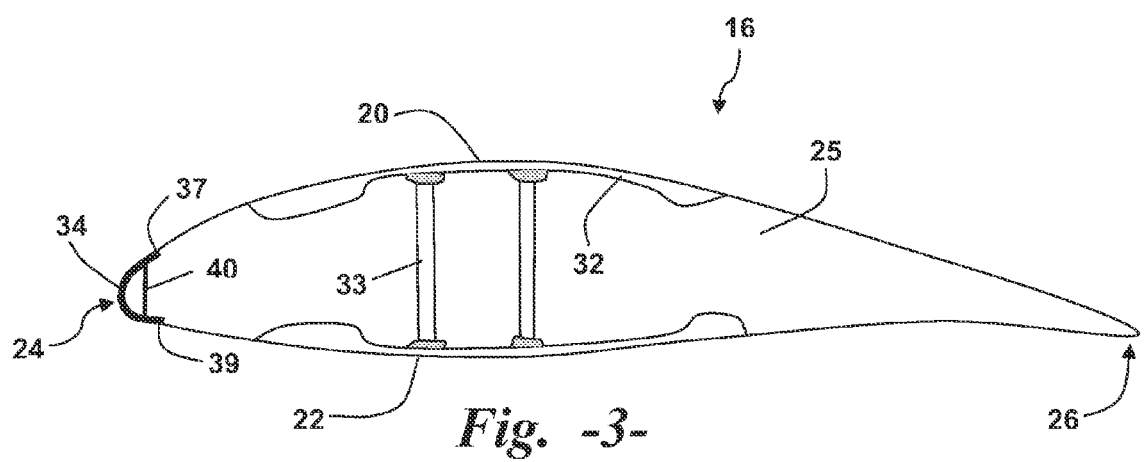
Fig. -3-

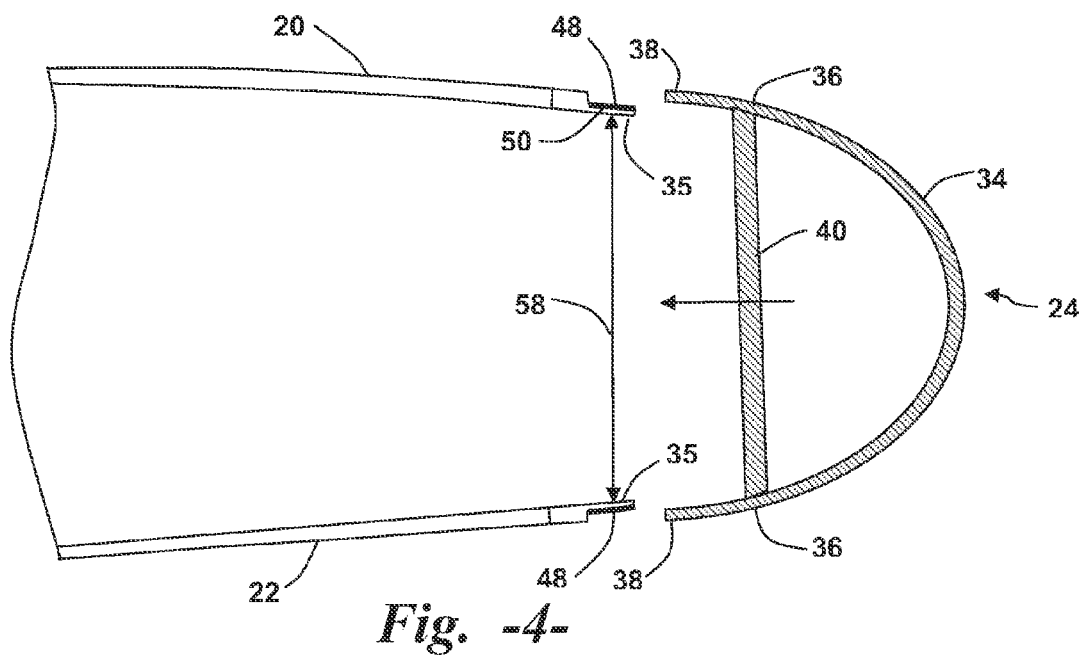
Fig. -4-
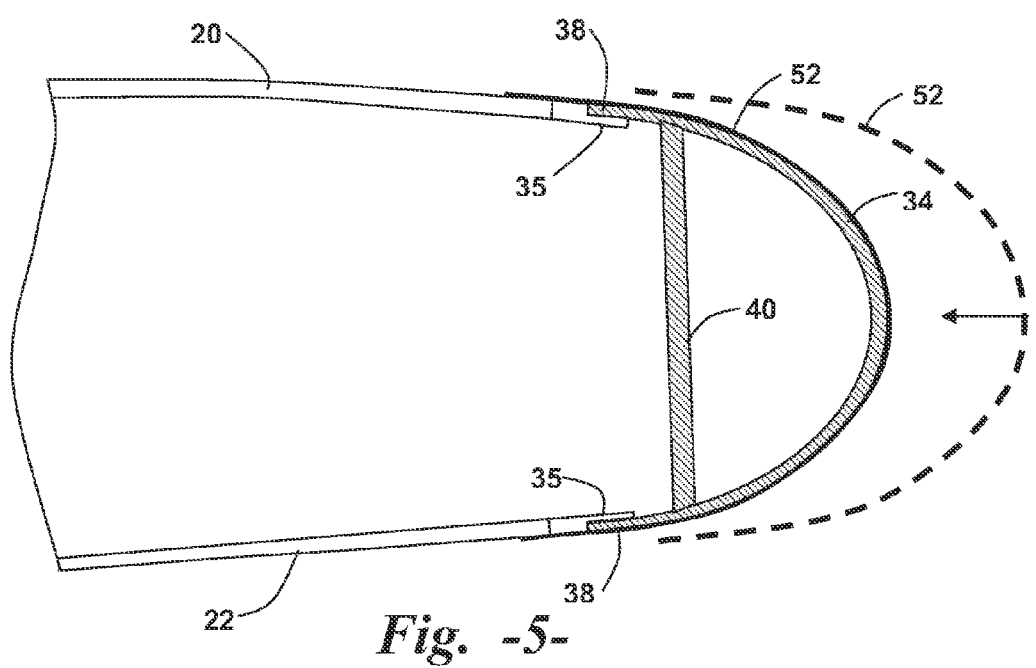
Fig. -5-

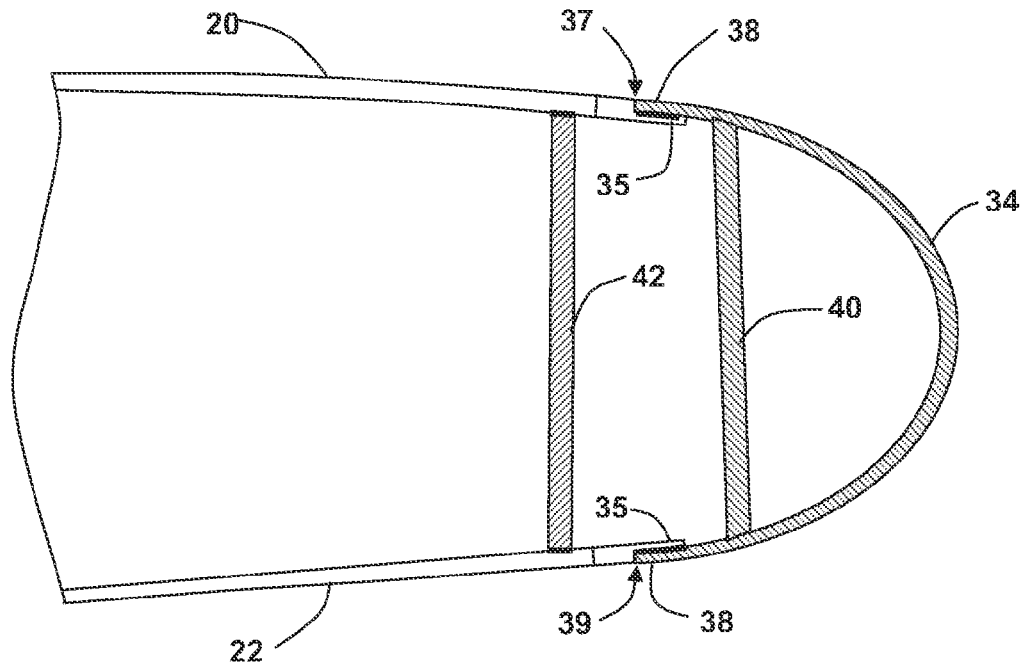
Fig. -6-
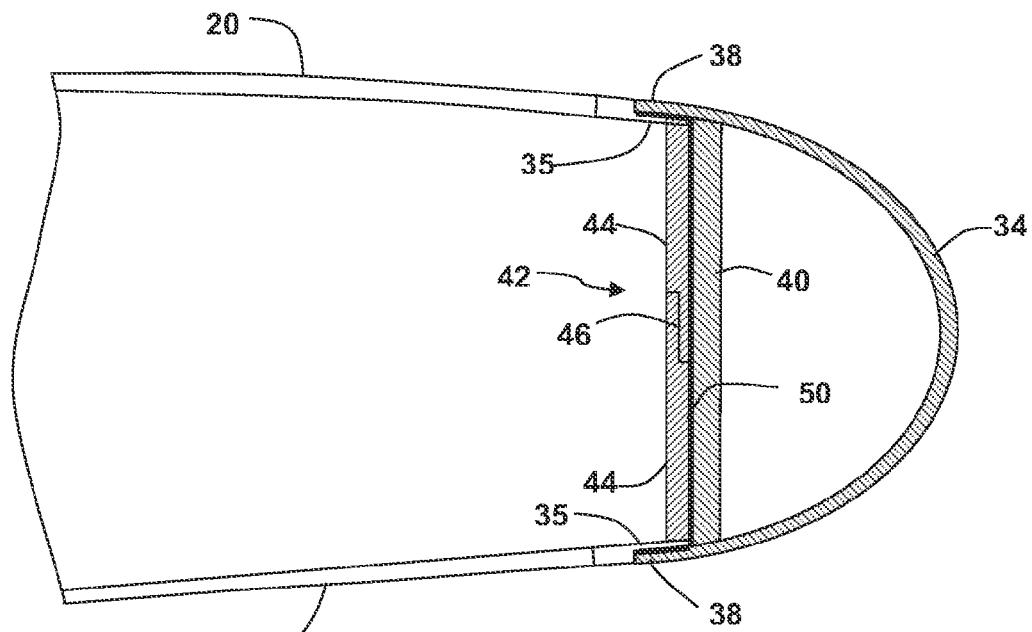
Fig. -7-

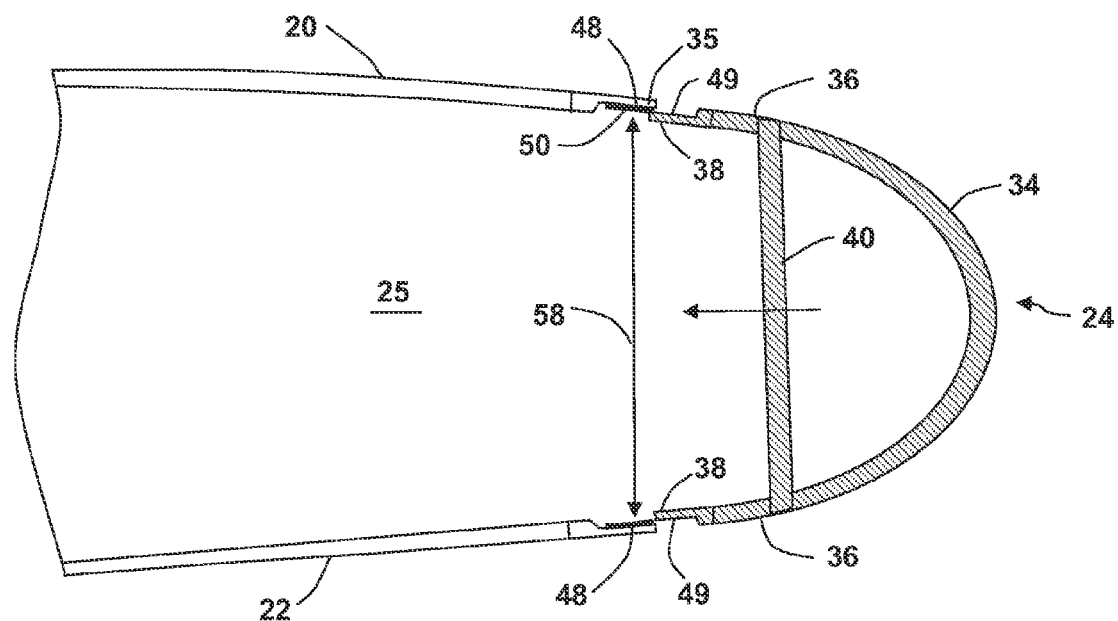
Fig. -8-

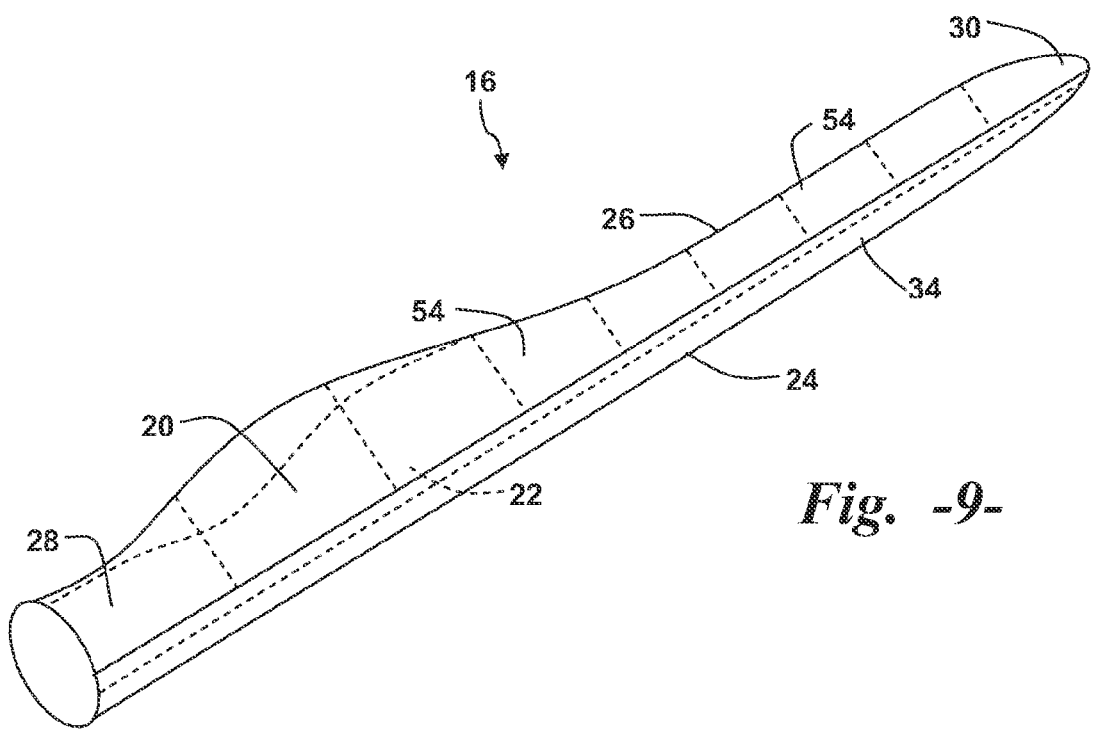
Fig. -9-
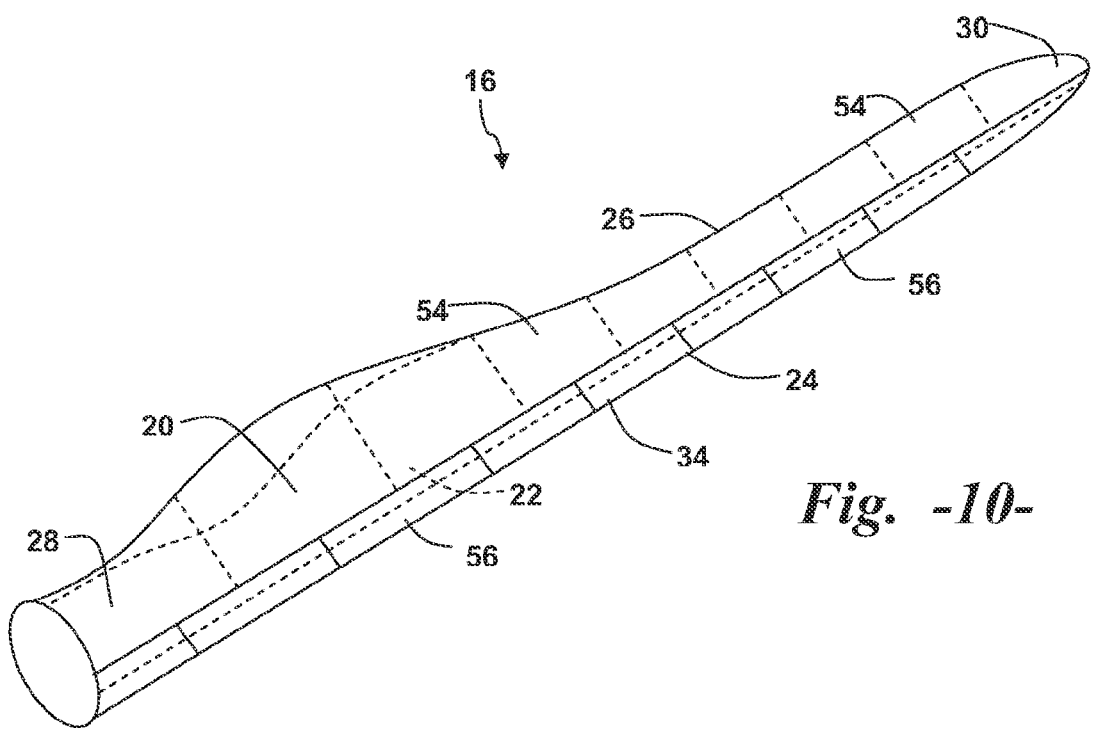
Fig. -10-

WIND TURBINE BLADE WITH MODULAR LEADING EDGE

RELATED APPLICATION

The present invention is a Continuation Application of U.S. application Ser. No. 12/968,709, filed Dec. 15, 2010.

FIELD OF THE INVENTION

The present invention relates generally to the field of wind turbines, and more particularly to turbine blades having an improved leading edge configuration.

BACKGROUND OF THE INVENTION

Turbine blades are the primary elements of wind turbines for converting wind energy into electrical energy. The blades have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to a generator for producing electricity.

The turbine blades typically consist of a suction side shell and a pressure side shell that are bonded together at bond lines along the trailing and leading edges of the blade. The bond lines are generally formed by applying a suitable bonding paste or compound along the bond line with a minimum designed bond width between the shell members. These bonding lines are a critical design constraint of the blades. A significant number of turbine blade field failures are bond line related, particularly leading edge failures. Separation of the bond line along the leading edge of an operational turbine blade can result in a catastrophic failure and damage to the wind turbine.

In addition, the leading edge bonding process is a challenging and time consuming task. Application of the bond paste to achieve the required bonding thickness and width is difficult. Post-bond trimming of the leading edge to remove excess bond paste, trim reinforcement material, and so forth, is a time consuming and expensive finishing operation. Even after the trimming process, it is often necessary to perform subsequent edge repairs/modifications before the blade is field-ready. For example, if they occur, any leading edge "overbite" or "underbite" defects must be corrected. These overbite and underbite defects are the result of chord-wise misalignment between the upper and lower shell members.

Conventional leading edge bond configurations are also highly susceptible to erosion in the field, which results in costly and expensive field repairs.

U.S. Patent Application Pub. No. 2007/0036659 proposes a wind turbine blade construction wherein the shell components are joined at the leading and trailing edges and one or more front covers formed into a shape corresponding to the structure of the shell components are adhered to the shell components along the leading edge. This construction is alleged to reduce the "after-treatments" typically required after the shell components are joined, such as filling of the shell joints, scratches, cavities, and the like, with gel coat of other filler materials, as well as grinding and polishing of the leading edge.

U.S. Pat. No. 7,637,721 describes a trailing edge cap intended to be placed over the designed trailing edge of a wind turbine blade in order to reduce noise generated at the trailing edge. The cap has a configuration so as to extend well past the original trailing edge of the blade and to define a reduced trailing edge thickness as compared to the original trailing edge. The cap is flexible and is designed to conform to a variety of differently sized and shaped turbine blades. Although this trailing edge cap may provide reduced noise benefits, it does not address structural bonding issues associated with the trailing edge.

Accordingly, the industry would benefit from an improved bond configuration for a wind turbine blade that is cost effective, time efficient, and produces an improved structural bond, particularly along the leading edge of the wind turbine blade.

BRIEF DESCRIPTION OF THE INVENTION

Aspects and advantages of the invention will be set forth in part in the following description, or may be obvious from the description, or may be learned through practice of the invention.

In accordance with aspects of the invention, a wind turbine blade is provided with a leading edge and a trailing edge. The blade includes an upper shell member and a lower shell member, with each of the shell members having a forward attachment edge spaced rearward of the leading edge. A preformed bond cap has opposite legs with rearward edges of the legs mounted to the attachment edges of the upper and lower shell members. The bond cap is preformed into an aerodynamic parabolic shape and size so as to define the leading edge of the blade and lie essentially flush with the upper and lower shell members. The bond cap thus defines a primary external bonding bridge between the upper and lower shell members and defines at least a portion of the leading edge of the blade.

In a particular embodiment, an internal structural stiffener is disposed between the opposite legs of the bond cap. A structural support wall may also extend between the upper and lower shell members adjacent to the attachment edges. This support wall may be a structural element attached to each of the upper and lower shell members. In an alternate embodiment, the support wall may be a transverse extension of at least one of the upper and lower shell members joined along a bond line to the other respective shell member.

In certain embodiments, the attachment edges may include recessed surfaces, with the rearward edges of the bond cap residing within the recessed surfaces so as to be essentially flush with the upper and lower shell members. The rearward edges of the bond cap may be bonded to the recessed surface.

In a different embodiment, the rearward edges of the bond cap are unbonded to the recessed surfaces and a laminate covering is applied over the bond cap and attachment surfaces and is bonded to the upper and lower shell members.

The bond cap may be variously configured. In one embodiment, the bond cap is a continuous structural member disposed along the leading edge of the blade. In a different embodiment, the blade is formed from a plurality of blade segments, with the bond cap being common to and interconnecting the blade segments. In still a further embodiment, the blade is formed form a plurality of blade segments and a plurality of the bond caps are provided, with a respective bond cap bridging adjacent blade segments.

The invention also encompasses a wind turbine having one or more turbine blades configured with the unique bond line configuration described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art is set forth in the specification, which makes reference to the appended figures, in which:

FIG. 1 is a perspective view of a conventional wind turbine;

FIG. 2 is a perspective view of an embodiment of a wind turbine blade with a leading edge bond cap in accordance with aspects of the invention;

FIG. 3 is a cross-sectional view of an exemplary wind turbine blade with a leading edge bond cap;

FIG. 4 is an enlarged cross-sectional view of an embodiment of a leading edge bond cap configuration;

FIG. 5 is an enlarged cross-sectional view of another embodiment of a leading edge bond cap configuration;

FIG. 6 is an enlarged cross-sectional view of an alternate embodiment of a leading edge bond cap configuration;

FIG. 7 is an enlarged cross-sectional view of still another embodiment of a leading edge bond cap configuration;

FIG. 8 is an enlarged cross-sectional view of yet a different embodiment of a leading edge bond cap configuration;

FIG. 9 is a perspective view of an embodiment of a wind turbine blade with a leading edge bond; and, FIG. 10 is a perspective view of an alternative embodiment of a wind turbine blade with a leading edge bond cap;

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention include such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of turbine blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

FIG. 2 is a more detailed view of a wind turbine blade 16. The blade 16 includes an upper shell member 20 and a lower shell member 22. The upper shell member 20 may be configured as the suction side surface of the blade 16, while the lower shell member 22 may be configured as the pressure side surface of the blade. The blade 16 includes a leading edge 24 and a trailing edge 26, as well as a root portion 28, and a tip portion 30. As is well known in the art, the upper shell member 20, and lower shell member 22 are joined together at the leading edge 24 and trailing edge 26. The blade 16 includes an internal cavity 25 in which various structural members, such as spar caps 32 and webs 33, are configured.

Referring to FIGS. 2 through 4, the shell members 20, 22 include forward attachment edges 35 that are transversely spaced from each other by a transverse distance 58. The edges 35 are thus also spaced rearward of the leading edge 24. These attachment edges 35 define mounting locations for a preformed bond cap 34. In particular, the bond cap 34 has opposite legs 36 with rearward edges 38 that mount to the attachment edges 35. The bond cap 34 is preformed into a parabolic, aerodynamic shape of the leading edge 26. The bond cap 34 may thus be considered as a bonding bridge between the upper and lower shell members 20, 22 that is desirably flush with the suction side and pressure sides of the blade 16 and defines the structural leading edge 24 of the blade. Thus, it should be understood that the bond cap 34 is not a protective covering that is placed over an existing leading edge of a blade, but is a rigid, structural component that extends from the attachment edges 35 to define the designed leading edge profile of the blade 16. The bond cap 34 defines an external bonding bridge that is the primary seal between the upper and lower shell members 20, 22. The bond cap 34 also eliminates the risk of overbite or underbite defects in the blade 16 between the upper and lower shell members 20, 22.

The bond cap 34 may be an original component of a blade 16, or a repair/replacement component that is readily attachable to existing blades in the field. Thus, leading edge blade failures can be corrected with replacement bond caps 34 without the necessity of replacing the entire blade 16.

The bond cap 34 may be mounted to the upper and lower shell members 20, 22 along the attachment edges 35 in various ways. For example, in the embodiments of FIGS. 4, 6, and 7, the attachment edges 35 are formed with recessed surfaces 48 on which the rearward edges 38 of the bond cap 34 are mounted with, for example, a suitable bond paste 50, along respective bond lines 37, 39 (FIGS. 2 and 3). The recessed surfaces 48 allow for a relatively flush transition from the bond cap 34 to the suction and pressure sides of the blade 16 so as not to detract from the aerodynamic performance of the blade 16, or generate noise.

It should be appreciated that the term "bond paste" is used herein in a generic sense to encompass any type of adhesive or bonding material. The particular type of bond paste is not particularly relevant to the present invention, and any suitable type of epoxy, compound, or other material may be used in this regard.

In the embodiment of FIG. 5, the rearward edges 38 of the bond cap 34 are unbonded to the attachment edges 35. A laminate covering 52, such as a fiberglass matting material, is placed over the bond cap 34 and extends over the transition points from the bond cap 34 to the upper and lower shell members 20, 22, as depicted in FIG. 5. This laminate covering 52 is bonded to the bond cap 34 and the upper and lower shell members 20, 22 and secures the bond cap 34 to the shell members. This configuration may be desired in that it eliminates post-cure steps that may be required if bond paste 50 is used between the bond cap 34 and shell members 20, 22 along the bond lines 37, 39.

Any manner of structural support may be provided within the bond cap 34, such as the stiffener element 40 depicted in the figures that extends between the opposite legs 36 of the bond cap. The stiffener element 40 may be integrally formed with the bond cap 34, or may comprise a member that is separately formed and subsequently bonded to the inner surfaces of the legs 36. The stiffener element 40 may include any manner and configuration of internal web components within the bond cap 34.

Any manner of structural support may also be provided within the internal cavity 25 of the blade 16 generally adjacent to the attachment edges 35 of the shell members 20, 22. For example, in the embodiment of FIG. 6, a support wall 42 is disposed between the shell members 20, 22 spaced back from the attachment edges 35. In the embodiment of FIG. 7, the support wall 42 is essentially flush with the attachment edges 35 such that the edges 35 and support wall 42 define a closed box-like structure against which the stiffener element 40 of the bond cap 34 is mounted with a bond paste or any other suitable bonding technique.

Still referring to FIG. 7, the support wall 42 may be defined by a lateral extension 44 of one or both of the upper and lower shell members 20, 22. These extensions may be co-molded with the shell members and bonded at a line 46 so as to define the closed-ended structure depicted in the figure. In an alternate embodiment, only one extension 44 may be provided, which extends from one of the shell members 20, 22 to the attachment edge 35 of the opposite shell member.

FIG. 8 is an embodiment similar to FIG. 4 in that the attachment edges 35 of the upper and lower shell members 20, 22 define a recessed surface 48 for attachment of the rearward edges 38 of the bond cap 34. However, in this embodiment, the recessed surfaces 48 are oriented inwardly towards the internal cavity 25 of the blade and the rearward edges 38 define their own recessed surface 49 that attaches to the respective recessed surface 48 with bond paste 50. Thus, in this embodiment, the rearward edges 38 mount to an internal surface of the upper and lower shell members 20, 22 at the attachment edges 35 yet define a flush external joint along the bond lines 37, 39.

The bond cap 34 may take on various shapes and configurations within the scope and spirit of the invention as a function of the desired profile of the leading edge 24 for a particular blade 16. In particular embodiments illustrated for example in FIGS. 2 and 9, the bond cap 34 is a continuous structural member having an open end defined by the diverging legs 36 and extends generally along the entirety of the leading edge 24.

Referring to FIGS. 9 and 10, the turbine blade 16 may be formed from a plurality of blade segments 54, as is known in the art. With this type of blade configuration, the bond cap 34 may be incorporated in various ways. For example, referring to the embodiment of FIG. 9, the bond cap 34 may be a single member that is common to and bridges multiple ones (or all) of the blade segments 54. With this embodiment, the individual blade segments 54 are not provided with individual bond caps and, after assembly of the segments 54 into a blade, the single bond cap 34 may be attached to define the leading edge 24 of the blade 16, as discussed above.

In an alternate embodiment illustrated in FIG. 10, the bond cap 34 is defined by a plurality of bond cap segments 56 that are longitudinally aligned at the leading edge 24 of the blade segments 54. Each blade segment 54 may include its own respective bond cap segment 56. Alternatively, the bond cap segments 56 may be staggered relative to the blade segments 54 such that a bond cap segment 56 bridges adjacent blade segments 54, as illustrated in FIG. 10.

The present invention also encompasses any configuration of a wind turbine 10 (FIG. 1) wherein at least one of the blades 16 is configured with the unique advantages of the invention as discussed above.

It should also be appreciated that the bond cap 34 described herein as a leading edge component of the blade 16 may also have utility as a trailing edge component. In other words the bond cap 34 may alternately (or in addition to) be structured as a trailing edge bond cap 34 with the structure and advantages as described herein. The present invention encompasses all such trailing edge configurations of the bond cap 34.

While the present subject matter has been described in detail with respect to specific exemplary embodiments and methods thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A wind turbine blade with a leading edge and a trailing edge, said blade comprising:
    an upper shell member and a lower shell member, each of said upper shell member and said lower shell member comprising a forward attachment edge, said attachment edges transversely spaced from each other and disposed rearward of said leading edge;
    a preformed bond cap having opposite legs with rearward edges mounted to said attachment edges of said upper and lower shell members, said bond cap preformed into an aerodynamic parabolic shape and size so as to define said leading edge of said blade and lie essentially flush with said upper and lower shell members;
    wherein said bond cap defines a primary external bonding bridge between said upper and lower shell members and defines at least a portion of said leading edge of said blade; and
    wherein said rearward edges of said bond cap are unbonded to said attachment edges, and further comprising a laminate covering over said bond cap that extends over said attachment surfaces and is bonded to said upper and lower shell members.

2. The wind turbine blade as in claim 1, further comprising an internal structural stiffener between said opposite legs of said bond cap.

3. The wind turbine blade as in claim 1, further comprising a structural support wall extending between said upper and lower shell members adjacent said attachment edges.

4. The wind turbine blade as in claim 3, wherein said support wall is a structural element attached to each of said upper and lower shell members.

5. The wind turbine blade as in claim 3, wherein said support wall comprises a transverse extension of at least one of said upper and lower shell members joined along a bond line to the other respective said shell member.

6. The wind turbine blade as in claim 5, further comprising an internal structural stiffener between said opposite legs of said bond cap.

7. The wind turbine blade as in claim 1, wherein said attachment edges comprise recessed surfaces, said rearward edges of said bond cap residing within said recessed surfaces so as to be essentially flush with said upper and lower shell members.

8. The wind turbine blade as in claim 1, wherein said bond cap comprises a continuous structural member along said leading edge of said blade.

9. The wind turbine blade as in claim 8, wherein said blade comprises a plurality of blade segments, said bond cap common to and interconnecting said blade segments.

10. The wind turbine blade as in claim 1, wherein said blade comprises a plurality of blade segments and a plurality of said bond caps, with a respective said bond cap bridging adjacent said blade segments.

11. The wind turbine as in claim 1, wherein said bond cap comprises a continuous structural member along said leading edge of said blade.

12. A wind turbine blade with a leading edge and a trailing edge, said blade comprising:
- an upper shell member and a lower shell member, each of said upper shell member and said lower shell member comprising a forward attachment edge, said attachment edges transversely spaced from each other and disposed rearward of said leading edge;
- a preformed bond cap having opposite legs with rearward edges mounted to said attachment edges of said upper and lower shell members, said bond cap preformed into an aerodynamic parabolic shape and size so as to define said leading edge of said blade and lie essentially flush with said upper and lower shell members;
- wherein said bond cap defines a primary external bonding bridge between said upper and lower shell members and defines at least a portion of said leading edge of said blade; and
- wherein said blade comprises a plurality of blade segments and a plurality of said bond caps, with a respective said bond cap bridging adjacent said blade segments.

13. The wind turbine as in claim 12, further comprising a structural support element attached to each of said upper and lower shell members adjacent said attachment edges.

14. The wind turbine as in claim 12, wherein said upper and lower shell members are joined at a forward transverse support wall, said support wall comprising a transverse extension of at least one of said upper and lower shell members.

15. The wind turbine as in claim 14, further comprising an internal structural stiffener between said opposite legs of said bond cap.

16. The wind turbine as in claim 12, wherein said attachment edges comprise recessed surfaces, said rearward edges of said bond cap residing within said recessed surfaces so as to be essentially flush with said upper and lower shell members.

17. The wind turbine as in claim 12, wherein said rearward edges of said bond cap are unbonded to said recessed surfaces, and further comprising a laminate covering over said bond cap that extends over said attachment surfaces and is bonded to said upper and lower shell members.

* * * * *